Figure 1:
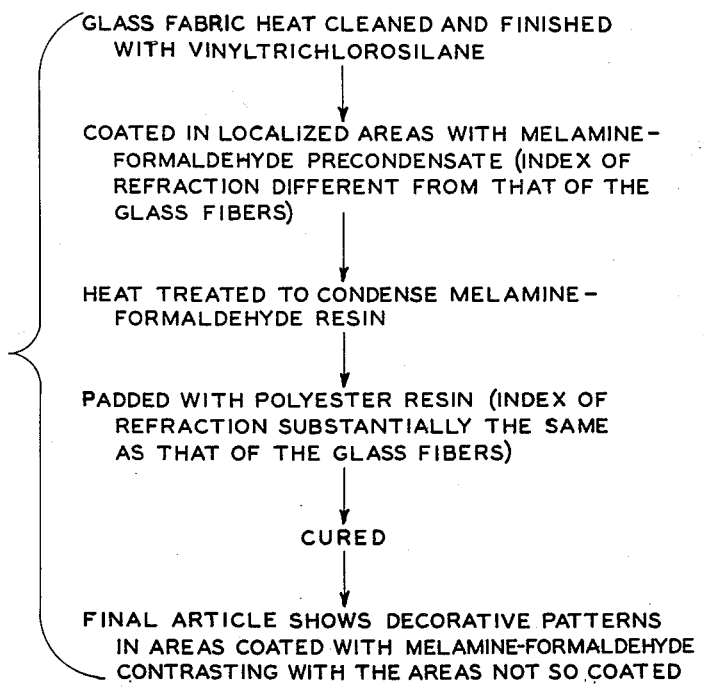

June 1, 1965 E. CLAEYS 3,186,866

GLASS FIBER REINFORCED PLASTIC AND METHOD

Filed Aug. 17, 1962

INVENTOR
ETIENNE CLAEYS

BY *Joshof r Ishuff,*

ATTORNEYS

United States Patent Office 3,186,866
Patented June 1, 1965

3,186,866
GLASS FIBER REINFORCED PLASTIC
AND METHOD
Etienne Claeys, Zele, Belgium, assignor to Syncoglas
N.V., Zele, Belgium, a limited-liability company
Filed Aug. 17, 1962, Ser. No. 217,547
16 Claims. (Cl. 117—126)

This invention relates to a method for the production of glass fiber reinforced plastics and to the resultant article. More particularly, the invention relates to the production of a decorative effect in such articles.

It is well known to reinforce plastics such as polyester resins, melamine-formaldehyde resins, acrylic resins, and other translucent resins by embedding glass fibers in the resin and curing the resin. The fibers may be used in the form of cut or uncut rovings, yarns, loose fibers, woven fabric, knitted fabric, or non-woven mats and bats. According to the present invention, all such forms of glass fiber reinforcement can be used.

The laminates, or reinforced plastics, obtained by embedding glass fibers in plastics, whether the fibers be loose or in the form of a fabric, are strong and light. In many cases they are as strong as steel although having much lower density.

As used hereinafter in the specification and claims, "glass fiber reinforcement" refers to fiber reinforcement whether the fibers be in the form of loose fibers or in the form of a cloth, fabric, or other self-sustaining type of sheet. The expression "glass fiber textile" will be used to include woven or knitted fabric or other fabrics wherein the fibers are interlaced as well as to fabrics, bats or mats made of non-woven or non-interlaced fibers.

In order to provide proper reinforcement to the plastic, the glass fibers have to be specially treated. For example, glass fiber textiles, particularly those made of interlaced fibers, are subjected to what is called a cleaning and finishing treatment which consists in removing all sizing or lubricating agents and replacing them by bridging agents or binders for effecting a better bond between the plastic and the fibers. The sizing or lubricating agents, usually comprising oil or materials like dextrin or potato flour, are put on the fibers during the spinning process in order to make them stronger, more resistant to rubbing, and to lubricate them for the weaving, knitting or mat fabrication process. These sizing or lubricating agents do not adhere particularly well to the plastics and they should be removed to obtain good adhesion.

Normally they may be removed by heat or chemical treatment. Heat cleaning is effected by heating the textile in an oven at about 350° C. for about 15 hours and followed by further heating at 450° C. for about another 10 hours. Glass fiber textiles can also be cleaned chemically by washing them with soap and water or emulsifying agents, followed by solvent washing in perchlorethylene or other solvents. Optionally, the chemical cleaning can be followed by heat cleaning.

After cleaning, the cleansed glass fiber textile is normally impregnated with bridging agents or binders which form a bridge or a bond between the glass molecules (probably the hydroxyl groups therein) and the resin molecules (generally the vinyl groups therein). The treatment with the bridging agent is frequently referred to as "finishing." Many bridging agents are known in the art and among these are vinyltrichlorosilane (e.g., Silane A 172 from Union Carbide) and methacrylatochromechloride (e.g., Volan from du Pont de Nemours).

Alternatively, instead of placing the normal sizing or lubricating agents on the fibers or filaments immediately after formation, the bridging agent can be applied directly to the raw glass fibers to produce fibers which are already finished and thereby avoid the cleaning operation.

Glass fiber reinforcement, after being finished as above set forth, is then embedded in the plastic and the resin is hardened. When the reinforcement is put into contact with the plastic, and particularly when the plastic is a polyester resin, the fibers appear to become translucent and seem to dissolve in the liquid resin and the translucency or the transparency persists even after the resin is polymerized or cured. U.S. Patent No. 2,746,896 to Thompson discloses in detail the preparation of glass fiber reinforced plastics as described above and sets forth additional examples of bridging agents and resins in which the reinforcement is embedded. It is possible to color the bridging agents to obtain a colored translucent product as described in French Patent No. 1,132,818. The present invention is directed to modifications of the conventional process whereby a decorative effect is obtained by rendering visible in the finished product some of the glass fibers of the reinforcement. A decorative effect may be obtained by using glass fibers which have not been freed from the sizing agents or by using fibers which have been treated with anti-adhesive agents containing oils, waxes, or silicone resins that produce a dividing film between the fibers and the plastics. However, such a procedure would greatly reduce the strength of the resultant article. According to such a process the fibers serve only decorative purposes and because of their lack of bonding to the plastic contribute very little or almost nothing to the reinforcement or strength of the plastic. According to the present invention, however, glass fiber reinforcement may be used to achieve a decorative effect while still maintaining all or most of the strengthening effect of the reinforcement. More specifically, according to the invention, the glass fiber reinforcement is only partially coated or treated with a binder, the binder having a refractive index different from that of the plastic in which the reinforcement will be embedded. These binders are bridging agents and thereby the strengthening effect of the reinforcement is preserved.

The glass fiber reinforcement, according to the present invention, may be partially treated with the binders having a different refractive index in many ways. One way is to first provide a glass fiber textile which has been cleaned and finished, and then apply the binders to spaced-apart areas of the textile by sprinkling or printing the binder onto the textile. According to another method, some fibers are finished after spinning while other fibers are treated with binders having a different refractive index and then a textile is made using the two different types of fibers.

Figure 2:
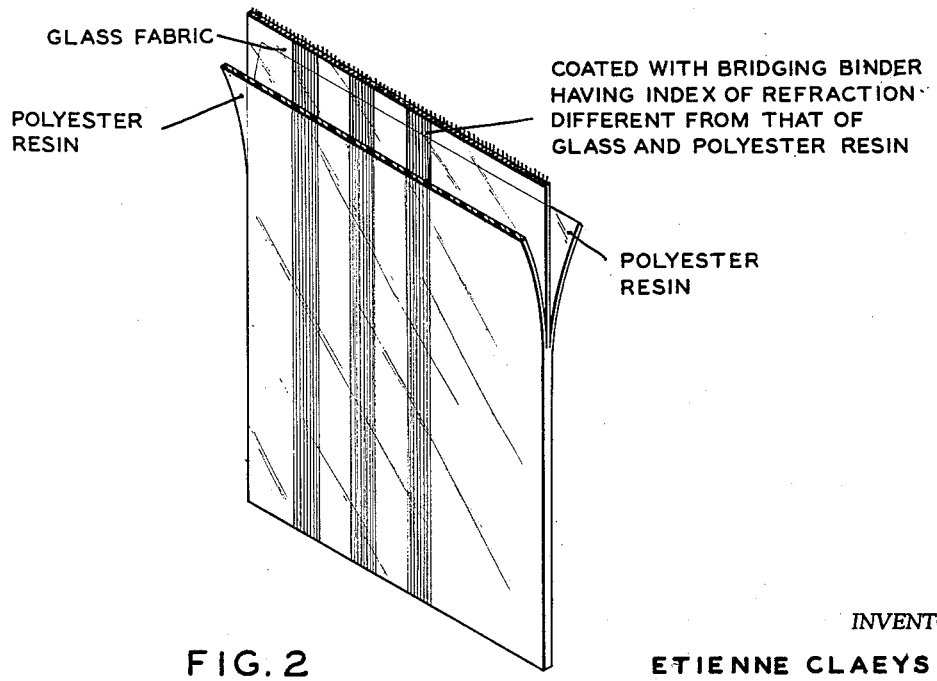

In the accompanying drawing, FIGURE 1 is a flow chart showing the steps of a process of the invention, and FIG. 2 shows a perspective view of the product produced by the process of FIG. 1, the top edge having the various layers turned apart to show the different laminations.

When the glass fiber reinforcement is partially treated with binders having a different refractive index from that of the plastic, the part of the fibers treated with these binders will remain non-translucent in the finished article while the part of the fibers which has been subjected to a normal treatment will become translucent. Several specific examples of the present invention will be now set forth.

*Example 1*

Woven glass fabric is heat cleaned and finished with vinyltrichlorosilane (Silane A 172). The finished fabric is then printed in localized areas with a melamine-formaldehyde precondensate which is obtained by reacting melamine with formaldehyde and adding thereto an acid-liberating catalyst prior to condensation.

The printed textile is then heat treated in an oven at 120° C. to completely condense the melamine-formaldehyde resin.

The cured melamine-formaldehyde resin is a bridging agent or binder for effecting a good bond between the glass and the polyester resin in which the textile is subsequently embedded. The textile, thus locally treated with melamine-formaldehyde resin, is then padded with a catalyzed polyester resin containing acrylic ester monomers as described in the aforementioned U.S. Patent No. 2,746,896, and the fabric is squeezed to eliminate air bubbles. The polyester resin is then permitted to cure or polymerize at room temperature or in an oven at about 80° C., or in a heated press under pressure.

During polymerization, the polyester resin completely wets the printed glass fiber textile and all unprinted parts become translucent as the polymerized polyester resin has approximately the same refractive index as the glass itself but all printed parts are opaque because the melamine-formaldehyde resin has a refractive index different from glass. FIG. 1 shows the process of this example, and FIG. 2 shows the resultant product.

Optionally, the melamine-formaldehyde precondensate can contain a commercial pigment. In the above example the melamine-formaldehyde can be replaced by polyvinyl acetate resin, and this also produces a good bond.

*Example 2*

A glass fiber cloth is produced by weaving with yarns which have been cleaned and finished and with yarns that have been treated with a binder such as the melamine-formaldehyde resin described in Example 1. Every fifth warp yarn and every fifth weft yarn will be one that has been treated with melamine-formaldehyde while the remaining yarns are the ones which have been conventionally cleaned and finished. This fabric is then embedded in a polyester resin as described in Example 1 and a product is thereby produced which shows a network of small decorative squares.

As has been stated previously, the present invention uses conventional embedding techniques and may use conventional plastics in which the reinforcement is embedded. The preferred plastics are alkyd resins and polyester resins but other embedding resins such as known in the art including those mentioned previously can be used.

A good example of such a polyester resin is Paraplex P-444A or P-446A made by Rohm and Haas, Philadelphia. Both types are solutions of an unsaturated polyester in monomeric styrene containing methylmethacrylate.

What is claimed is:

1. A method of producing decorative glass fiber reinforced plastic articles comprising providing glass fiber reinforcement coated only in certain areas with a bridging binder, embedding said reinforcement in the plastic and hardening the plastic, said binder having a refractive index different from that of the plastic, the fibers of said reinforcement and said plastic having substantially the same refractive index to produce a pattern in said areas which visually contrast with the remaining areas of said reinforcement.

2. A method according to claim 1 wherein the reinforcement comprises a glass fiber textile.

3. A method according to claim 2 wherein the reinforcement is partially coated with said bridging binder by coating only some of the fibers.

4. A method according to claim 3 wherein the reinforcement contains selected glass fiber yarns coated with said bridging binder.

5. A method according to claim 2 wherein said bridging binder is applied in spaced-apart locations to the glass fiber textile.

6. A method according to claim 1 wherein the resin is a polyester resin containing acrylic ester.

7. A method according to claim 6 wherein said bridging binder is a melamine-formaldehyde resin.

8. A method according to claim 6 wherein said bridging binder is polyvinyl acetate resin.

9. A method of producing decorative glass fiber reinforced plastic articles comprising providing a glass fiber textile coated only in certain areas with a bridging binder, incorporating said fabric in the plastic and hardening the plastic, said plastic being a polyester resin containing acrylic ester monomer and said bridging binder comprising melamine-formaldehyde resin, the latter having a refractive index different from that of the plastic, the fibers of said textile and said plastic having substantially the same refractory index to produce a pattern in said areas which visually contrast with the remaining areas of said reinforcement.

10. A decorative glass fiber reinforced plastic containing a glass fiber reinforcement only in certain areas coated with a bridging binder having a refractive index different from that of the plastic, the fibers of said reinforcement and said plastic having substantially the same refractory index so that said areas form a pattern contrasting with the remaining areas of said reinforcement.

11. A decorative glass fiber reinforced plastic according to claim 10 wherein the reinforcement is in the form of said glass fabric textile.

12. A decorative glass fiber reinforced plastic according to claim 11 wherein only selected yarns of a textile are coated with a bridging binder.

13. A decorative glass fiber reinforced plastic according to claim 12 wherein the plastic is a polyester resin.

14. A decorative glass fiber reinforced plastic according to claim 13 wherein said bridging binder is selected from the group consisting of melamine-formaldehyde resin and polyvinyl acetate resin.

15. A method according to claim 1, wherein said reinforcement is coated, in areas other than those coated with the first-named bridging binder, with a second bridging binder, said second bridging binder having an index of refraction substantially the same as that of the plastic.

16. A decorative glass fiber reinforced plastic according to claim 10 wherein said reinforcement is coated with a second bridging binder in areas not coated by said first-named bridging binder, said second bridging binder having a refractive index substantially the same as that of the plastic.

References Cited by the Examiner

UNITED STATES PATENTS

| | | | |
|---|---|---|---|
| 2,311,613 | 2/43 | Slayter | 117—126 |
| 2,688,580 | 9/54 | Fingerhut | 156—314 |
| 2,746,896 | 5/56 | Thompson | 156—315 X |
| 2,781,287 | 2/57 | Gustus et al. | 161—57 |
| 2,830,925 | 4/58 | Fennebresque | 161—195 |
| 2,905,580 | 9/59 | Kreier | 161—201 |
| 2,951,001 | 8/60 | Rubenstein | 161—413 X |
| 2,980,574 | 4/61 | Mender | 161—194 |
| 3,034,945 | 5/62 | Bush | 65—156 |

FOREIGN PATENTS 559,244  6/58  Canada.

EARL M. BERGERT, *Primary Examiner.*